Feb. 25, 1964   C. GRUNSKY   3,122,158
GAS METER CHANGING DEVICE
Filed March 10, 1961
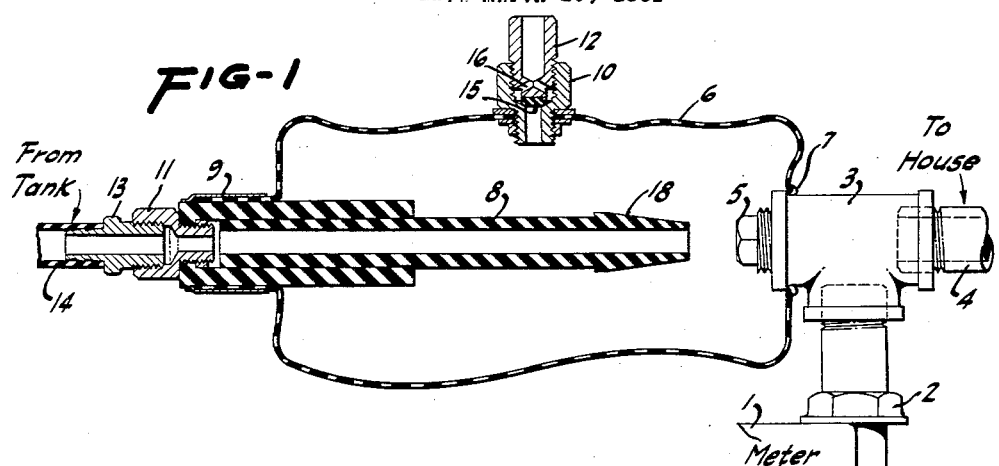
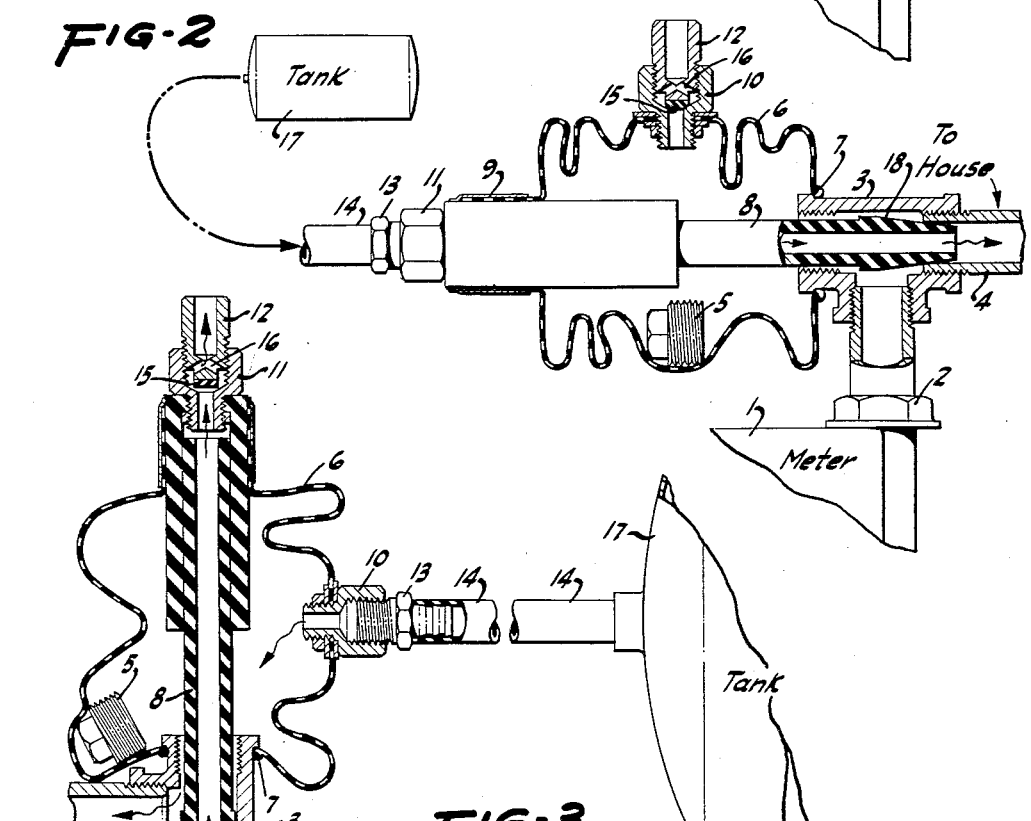
INVENTOR.
CHARLES GRUNSKY
BY
Lippincott, Ralls & Hendricson
ATTORNEYS

United States Patent Office 3,122,158
Patented Feb. 25, 1964

3,122,158
GAS METER CHANGING DEVICE
Charles Grunsky, 266 Lombard St.,
San Francisco 11, Calif.
Filed Mar. 10, 1961, Ser. No. 94,858
2 Claims. (Cl. 137—271)

This invention relates to means for supplying gas to an outlet pipe while changing the gas meter through which the gas normally flows to the outlet.

The present invention is useful with gas meter installations in which the meter is connected to an outlet pipe (e.g., the pipe leading into the house in a household gas supply installation), through a union and a T. Two arms of the T lie along a straight line and face in opposite directions; one of these arms is normally closed by a removable plug, and the other is connected either to the outlet pipe (herein called case I) or to a pipe leading from the meter (herein called case II). In case I, the base of the T (disposed at right angles to the aforesaid two arms) is connected to the pipe leading from the meter, and in case II the base is connected to the outlet pipe. The other side of the gas meter is conventionally connected to the gas supply mains through another union, usually a pressure regulator valve, and a cutoff valve.

At times it is necessary to replace the gas meter, either because it is defective, or because the meter must be tested and recalibrated, or for other reasons. The meter is replaced by shutting off the gas supply from the mains at the cutoff valve and loosening the two unions, whereupon the meter can be removed and a new meter inserted. However, when the supply of gas to the house is interrupted, all of the gas appliances within the house must be inspected and the pilot lights must be relit after the gas service is resored. This may take more time than the actual work of changing the meter.

In the co-pending application of Albert D. Petersen, Serial No. 94,873, filed March 10, 1961, and entitled "Method and Apparatus for Changing Gas Meters," there is described apparatus for maintaining a continuous supply of gas to the outlet pipe leading into the house while the meter is being changed, whereby the pilot lights remain lit and the average total time for making a meter change is cut approximately in half. The apparatus described in the Petersen application for use when the base of the T is connected to the pipe leading from the meter (case I), comprises a flexible rubber bag having an opening with a resilient rim that fits in gas-tight relation over the arm of the T that is normally closed by a removable plug. A tubular probe extends into the bag, through which the bag can be filled with gas from an auxiliary gas supply connected, through regulating apparatus and a flexible hose, to the outer end of the hollow probe. A petcock is provided for purging air from the bag while gas is supplied into the bag. After the bag is in place and filled with gas, the plug can be removed from the T, and the probe can be inserted through the T into the outlet pipe, whereby gas is continuously supplied from the auxiliary supply through the probe directly into the outlet pipe leading into the house. The normal supply from the mains through the meter is cut off while the meter is being changed.

As described in the Petersen application, somewhat different apparatus is required for use in installations wherein the base of the T is connected to the outlet pipe (case II). In this case, the supply hose opens directly into the flexible bag and the petcock is attached to the outer end of the hollow probe. Hence, when the probe is inserted through the T it extends into the pipe leading from the meter and seals off the meter from the flow of gas which now passes from the auxiliary supply through the flexible hose directly into the bag, outside of the probe, and flows around the outside of the probe into the T and thus into the outlet pipe.

The chief object of the present invention is to provide improved apparatus in which the same bag and fittings can be used with either type of installation. Thus, the number of bags and fittings required is cut in half, which is quite important, particularly in areas where each crew must be provided with bags and probes to fit several different pipe sizes.

According to the present invention, the device described by Petersen is modified as follows: an internally threaded, hollow coupling adapted to receive a hose connection is provided at the outer end of the probe, and an identical coupling is attached to and opens directly into the flexible bag. By this means, the flexible hose leading from the auxiliary gas supply can be connected to either of the two identical couplings for supplying gas either through the probe or directly into the flexible bag, selectively. The other one of the two identical couplings receives an insert which functions as a purge valve, and thus replaces the petcock of the Petersen apparatus.

A better understanding of the invention may be had from the following illustrative description and the accompanying drawings.

FIG. 1 of the drawings is a longitudinal section through the improved flexible bag, probe, and fittings, showing the bag attached to a T having its base connected to the gas meter.

FIG. 2 is a somewhat schematic view of the same apparatus at a later stage in the meter-changing operation, after the removable plug 5 has been removed from the T and the probe 8 has been inserted through the T into the outlet pipe.

FIG. 3 is a schematic view, partly in section, showing the improved apparatus in use with an installation in which the base of the T is connected to the outlet pipe.

Referring to FIG. 1 of the drawings, a typical household gas-supply installation, comprising a conventional gas meter 1 (only a fragment of which is shown in the drawings), is connected through a union 2 and a T 3 to an outlet pipe 4 leading into the house. In this installation, the meter is connected to the base of the T and the outlet pipe is connected to one of the two arms that lie opposite to each other. The opposite arm of the T is normally closed by a removable plug 5. In ordinary use, the meter receives gas from the gas supply mains through a conventional cutoff valve, usually a pressure regulator valve, and another union, which enables the meter to be removed and replaced.

Prior to the invention disclosed in the Petersen application identified above, the meter was changed by shutting off the gas supply from the mains at the conventional cutoff valve, which likewise interrupted the supply of gas to the house, after which the two unions could be loosened to remove the meter. A new meter was then inserted, and the cutoff valve opened to reestablish the gas supply; it was then necessary to inspect all household gas appliances and relight all pilot lights which had been extinguished when the gas supply was interrupted.

The Petersen invention made it possible in an installation of this type to insert a probe through the T for supplying gas from an auxiliary supply directly into the outlet pipe while the meter was being changed, thus avoiding any interruption of the gas supply to the house and cutting the average total time needed for a meter replacement approximately in half.

In an installation of the type shown in FIG. 1, the improved apparatus covered by this application performs essentially the same functions as the apparatus previously disclosed by Petersen. First, the removable plug 5 is loosened with a wrench sufficiently for it to be removed later in the manner herein described. A flexible rubber bag 6 is provided at one end with a circular opening, surrounded and defined by a resilient rim 7 that fits in gas-tight relation over the arm of the T closed by plug 5, as is shown in FIG. 1. A hard rubber, hollow, tubular probe 8 extends through the other end of bag 6, and the bag is sealed in gas-tight relation to this probe at 9, so that the flexible bag can be filled with gas supplied through the hollow probe.

Two identical, internally threaded, hollow couplings 10 and 11 are provided as shown. The coupling 10 is fastened to and extends through one side of the bag 6, while the coupling 11 is attached to the outer end of probe 8. Either of the identical couplings 10 and 11 will receive the externally threaded connection 13 of hose 14 leading from an auxiliary gas supply, e.g., a portable tank filled with gas under pressure, and preferably regulating apparatus like that disclosed in the aforesaid Petersen application.

For use with installations of the type shown in FIG. 1, where the base of the T is connected to the gas meter, the hose connection 13 is screwed into the coupling 11 attached to the outer end of probe 8, so that the gas from the auxiliary supply passes through the hollow probe. The other coupling, in this instance coupling 10, receives a hollow plug 12, having its bottom end faced with a disk of rubber 15, which abuts a shoulder within coupling 10 and blocks the passage of gas through the coupling when plug 12 is screwed down tightly. By turning the plug 12 to loosen it, the disk 15 is moved away from the shoulder within coupling 10 and gas is allowed to pass out of the bag 6 through the passages 16 provided in the hollow plug.

With the bag 6 attached to the T 3 as shown in FIG. 1, gas is supplied from the auxiliary supply through hose 14 and probe 8 to the interior of bag 6, and plug 12 is loosened to permit the escape of air from bag 6, until all air has been purged from the bag and the interior of the flexible rubber bag is filled with gas. Plug 12 is then screwed down tight, which closes the purge valve and prevents the further escape of gas. Plug 5 may now be grasped by the fingers through the flexible rubber bag 6 and unscrewed from the T 3, so that one arm of the T will now open into the rubber bag 6. The plug 5 simply falls to the bottom of bag 6 when it is released, as shown in FIG. 2.

Now the probe 8 is inserted through T 3 into the outlet pipe 4, as shown in FIG. 2. Gas from the auxiliary supply tank 17 flows through probe 8 directly into the outlet pipe 4 and thus into the house during the remainder of the meter-changing operation, so that there is no interruption of gas supply to the house, and all pilot lights remain lit. Preferably, the inner end of probe 8 is provided with a tapered portion 18 which fits in gas-tight relation into the pipe 4, and thus seals off the auxiliary gas supply from the meter connections. The normal gas supply to the meter is turned off at the cutoff valve, the unions are loosened, and the meter is removed and replaced, all without affecting the flow of gas to the house from the auxiliary supply.

After the new meter has been connected, and the conventional cutoff valve opened to connect the new meter to the gas mains, plug 12 is again loosened to open the purge valve, and allow any air present to be purged from the new meter. The purge valve is then closed by tightening plug 12, and probe 8 is withdrawn from T 3 while bag 6 remains in position. Next, plug 5 is grasped with the fingers through the flexible wall of bag 6 and reinserted into the open arm of T 3, and is screwed in as far as can conveniently be done with the fingers. The auxiliary gas supply is cut off, and the bag 6 removed. After tightening plug 5 with a wrench, the job is complete.

For installations in which the base of T 3 is connected to the outlet pipe 4, as illustrated in FIG. 3, the hose connection 13 is screwed into the coupling 10, which opens directly into the flexible bag 6; and the hollow plug 12, which forms the purge valve, is screwed into the coupling 11 at the outer end of probe 8. As in the preceding case, plug 5 is first loosened with a wrench, and then the resilient rim 7 is fitted in gas-tight relation over the arm of T 3 closed by the removable plug. The auxiliary gas supply represented by tank 17 is turned on so that gas flows through hose 14 and coupling 10 into flexible bag 6. Plug 12 is loosened to permit air to escape through the hollow probe 8 until all of the air is purged and bag 6 is completely filled with gas. Then plug 12 is tightened to close the purge valve.

Plug 5 is unscrewed from T 3 by grasping it with the fingers through the flexible rubber bag. After plug 5 has been removed from the T, probe 8 is inserted through the T into the connecting pipe leading from meter 1 and union 2, as shown in FIG. 3. Gas from the auxiliary supply passes through the bag 6 and around the outside of probe 8 into T 3, and thus into the outlet pipe 4 and so into the house. In this way, a continuous supply of gas from the auxiliary supply to the house is maintained while the meter is being changed.

The tapered end 18 of probe 8 fits in gas-tight relation to the pipe leading from the gas meter, and thus seals off the meter connections from the auxiliary gas supply flowing into the house. The normal gas supply to the meter can now be shut off in the usual way, and the meter removed and replaced. After the new meter is in place and receiving gas from the mains, plug 12 is loosened to permit any air present to be purged from the new meter through the hollow probe 8. Then plug 12 is tightened to close the purge valve, and probe 8 may be withdrawn from the T, while bag 6 remains in place. Next, plug 5 is grasped in the fingers through the flexible walls of the rubber bag, and is screwed into the open arm of T 3. The auxiliary gas supply is shut off, and the bag 6 can now be removed. After plug 5 is tightened with a wrench, the meter-changing job has been completed without any interruption in the gas supply through the outlet pipe 4 to the house, and all pilot lights of appliances within the house remain lit.

Various changes and modifications of the specific example illustrated and described can be made within the scope of the inventive principles disclosed.

What is claimed is:

1. A device for supplying gas to an outlet pipe while changing a gas meter connected to the outlet pipe through a T, one arm of the T being normally closed by a removable plug, said device comprising a flexible bag provided with a circular opening having a resilient rim adapted to fit in gas-tight relation over the arm of the T closed by the plug, a tubular probe extending into said bag, said bag being sealed in gas-tight relation to the probe, two essentially identical couplings, a first one of said couplings being attached to the outer end of said probe, and the second one of said coupling being attached to and extending through the wall of said bag, a flexible gas supply hose adapted for connection to either of said couplings, selectively, and means operable as a purge valve adapted to engage either of said couplings, selectively, whereby gas can be supplied through either coupling selected for connection to the gas supply hose and air purged through the other, said probe being adapted to extend through the T when the plug is removed therefrom and into the opposite arm of the T to define with the T two separate flow paths, one path extending through the probe and communicating with the opposite arm and the other path surrounding the probe and communicating with the bag and the base of the T.

2. A device for supplying gas to an outlet pipe while changing a gas meter connected to the outlet pipe through a T, one arm of said T being normally closed by a removable plug while the opposite arm of said T is connected to either the outlet pipe or a pipe leading from the gas meter, selectively, said device comprising a flexible rubber bag provided at one of its ends with a circular opening surrounded by and defined by a resilient rim adapted to fit in gas-tight relation over the arm of the T closed by the plug, a tubular rubber probe extending into the bag through the end thereof opposite said opening, said bag being sealed in gas-tight relation to said probe, said probe being adapted to extend through said T when the plug is removed from one arm thereof, and to fit in gas-tight relation into the pipe connected to the opposite arm thereof to define with the T two separate flow paths, one path extending through the probe and communicating with the pipe connected to said opposite arm and the other path surrounding the probe and communicating with the bag and the base of the T, two essentially identical, internally threaded couplings, each provided with an internal shoulder, a first one of said couplings being attached to the outer end of said probe and the second one of said couplings being attached to and extending through a side wall of said flexible bag, a flexible gas-supply hose adapted for connection to either of said internally threaded couplings, selectively, a hollow plug adapted to screw into either of said couplings, selectively, and to abut on the internal shoulder therein to form a purge valve whereby gas can be supplied through either coupling selected for connection to the gas supply hose and the hollow plug can be threaded into the other coupling for closing the same when the plug is threaded down tight and for purging the flexible bag and said other coupling when the plug is loosened.

References Cited in the file of this patent
UNITED STATES PATENTS

| | | |
|---|---|---|
| 976,804 | Hulings | Nov. 22, 1910 |
| 2,579,656 | Douglas | Dec. 25, 1951 |
| 2,711,753 | Hoke | June 28, 1955 |